United States Patent
Yuan et al.

(10) Patent No.: US 11,532,080 B2
(45) Date of Patent: Dec. 20, 2022

(54) NORMALIZING COUNTS OF PLANT-PARTS-OF-INTEREST

(71) Applicant: X Development LLC, Mountain View, CA (US)

(72) Inventors: Zhiqiang Yuan, San Jose, CA (US); Bodi Yuan, Sunnyvale, CA (US); Ming Zheng, Redwood City, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 128 days.

(21) Appl. No.: 16/950,037

(22) Filed: Nov. 17, 2020

(65) Prior Publication Data

US 2022/0156917 A1 May 19, 2022

(51) Int. Cl.
*G06V 20/10* (2022.01)
*G06T 7/00* (2017.01)
(Continued)

(52) U.S. Cl.
CPC ............. *G06T 7/0012* (2013.01); *G06N 3/04* (2013.01); *G06N 3/08* (2013.01); *G06T 7/60* (2013.01);
(Continued)

(58) Field of Classification Search
CPC ...... G06V 20/188; G06V 20/68; G06V 10/22; G06N 3/04; G06N 3/08; G06T 7/60;
(Continued)

(56) References Cited

U.S. PATENT DOCUMENTS 5,897,619 A 4/1999 Hargrove et al.
10,255,670 B1 4/2019 Wu et al.
(Continued)

FOREIGN PATENT DOCUMENTS

JP 2003006612 1/2003
WO 2019040866 2/2019

OTHER PUBLICATIONS

Cai, Jinhai et al.; Land-based crop phenotyping by image analysis: Accurate estimation of canopy height distributions using stereo images; PLOS One; 21 pages; dated May 24, 2018.
(Continued)

*Primary Examiner* — Shefali D Goradia
(74) *Attorney, Agent, or Firm* — Middleton Reutlinger

(57) ABSTRACT

Implementations are described herein for normalizing counts of plant-parts-of-interest detected in digital imagery to account for differences in spatial dimensions of plants, particularly plant heights. In various implementations, one or more digital images depicting a top of a first plant may be processed. The one or more digital images may have been acquired by a vision sensor carried over top of the first plant by a ground-based vehicle. Based on the processing: a distance of the vision sensor to the first plant may be estimated, and a count of visible plant-parts-of-interest that were captured within a field of view of the vision sensor may be determined. Based on the estimated distance, the count of visible plant-parts-of-interest may be normalized with another count of visible plant-parts-of-interest determined from one or more digital images capturing a second plant.

20 Claims, 6 Drawing Sheets

(51) Int. Cl.
| | |
|---|---|
| *G06V 10/22* | (2022.01) |
| *G06N 3/04* | (2006.01) |
| *G06N 3/08* | (2006.01) |
| *G06T 7/60* | (2017.01) |
| *G06V 20/68* | (2022.01) |
| *A01D 45/22* | (2006.01) |

(52) U.S. Cl.
CPC ............ *G06V 10/22* (2022.01); *G06V 20/188* (2022.01); *A01D 45/22* (2013.01); *G06T 2207/20084* (2013.01); *G06T 2207/30188* (2013.01); *G06T 2207/30242* (2013.01); *G06V 20/68* (2022.01)

(58) Field of Classification Search
CPC . G06T 2207/20084; G06T 2207/30188; G06T 2207/30242; A01D 45/22
See application file for complete search history.

(56) References Cited

U.S. PATENT DOCUMENTS

| | | | | |
|---|---|---|---|---|
| 10,719,709 | B2* | 7/2020 | Zemenchik | ............ A01C 21/00 |
| 10,721,859 | B2* | 7/2020 | Wu | ........................ A01C 21/005 |
| 2005/0192760 | A1 | 9/2005 | Dunlap | |
| 2017/0251589 | A1 | 9/2017 | Tippery et al. | |
| 2018/0025480 | A1 | 1/2018 | Dingle et al. | |
| 2018/0137357 | A1 | 5/2018 | Margalit et al. | |
| 2018/0189564 | A1 | 7/2018 | Freitag et al. | |
| 2018/0211156 | A1* | 7/2018 | Guan | ................... G06N 3/0445 |
| 2018/0293671 | A1* | 10/2018 | Murr | ....................... A01G 22/00 |
| 2018/0308229 | A1 | 10/2018 | Winkler et al. | |
| 2019/0064363 | A1* | 2/2019 | Redden | ..................... A01G 7/00 |
| 2019/0150357 | A1* | 5/2019 | Wu | ............................ G06T 7/73 |
| 2021/0158041 | A1* | 5/2021 | Chowdhary | ........... G05D 1/027 |

OTHER PUBLICATIONS

Dandrifosse, Sebastien et al.; Imaging Wheat Canopy Through Stereo Vision: Overcoming the Challenges of the Laboratory to Field Transition for Morphological Features Extraction; Frontiers in Plant Science; 15 pages; dated Feb. 18, 2020.
Jenni, Sylvie et al.; Improving the Prediction of Processing Bean Maturity Based on the Growing-degree; HortScience; 4 pages; dated 2000.
Rai, Abhijit et al.; Dry Bean [*Phaseolus vulgaris* L.] Growth and Yield Response to Variable Irrigation in the Arid to Semi-Arid Climate; Sustainability; 25 pages; dated 2000.
Yuan, Wenan et al.; Wheat Height Estimation Using LiDAR in Comparison to Ultrasonic Sensor and UAS; Sensors; 20 pages; dated 2018.
Lee, W.S.; Citrus Yield Mapping System in Natural Outdoor Scenes using the Watershed Transform; dated Jul. 2006.
Calafell, Davinia; Application of image processing methodologies for fruit detection and analysis; Universitat de Lleida; 86 pages; dated Jul. 2014.
Climate Fieldview—Yield Analysis; Video retrieved from https://www.youtube.com/watch?v=G6M-YGolxeA; dated Nov. 1, 2017.
Google Glass—New Tool for Ag; Video retrieved from https://www.youtube.com/watch?v=drypBC4bzLg; dated Oct. 31, 2014.
Grassi, Mathew; Google Glass: New Tool For Ag; retrieved from https://www.croplife.com/precision/google-glass-new-tool-or-toy-for-ag/; dated Oct. 8, 2014.
Klompenburg, Thomas et al.; Crop yield prediction using machine learning: A systematic literature review; Computers and Electronics in Agriculture; 18 pages; dated 2020.
Oh, S. et al., "Plant Counting of Cotton from UAS Imagery Using Deep Learning-Based Object Detection Framework;" Remote Sensing, vol. 12, No. 18; 22 pages; dated Sep. 14, 2020.
Valente, J. et al., "Automated Crop Plant Counting from Very High-Resolution Aerial Imagery;" Precision Agriculture, vol. 21, No. 6; 19 pages; dated May 20, 2020.
Garcia-Martinez, H. et al., "Digital Count of Corn Plants Using Images Taken by Unmanned Aerial Vehicles and Cross Correlation of Templates;" Agronomy, vol. 10, No. 4; 16 pages; dated Mar. 28, 2020.
European Patent Office; International Search Report and Written Opinion issued Application No. PCT/US2021/058240; 14 pages; dated Feb. 16, 2022.

* cited by examiner

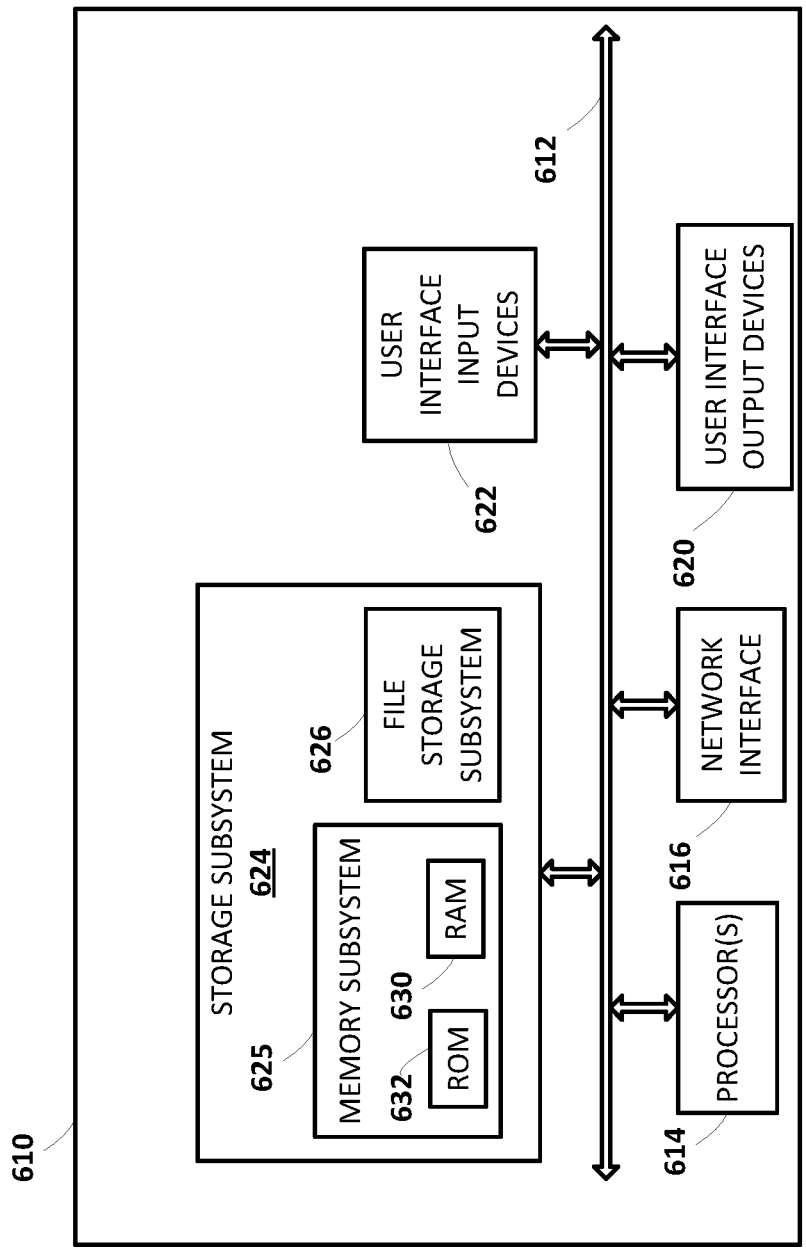

NORMALIZING COUNTS OF PLANT-PARTS-OF-INTEREST

BACKGROUND

Crops may have various constituent parts, referred to herein as "plant-parts-of-interest," that are of nutritional and/or economic interest to various entities. Plant-parts-of-interest may include, for instance, flowers, buds, pods (e.g., for beans, peas), leaves, stems, berries, fruit, etc. Plant-parts-of-interest of crops may be counted for various reasons, such as crop yield prediction, varietal selection, breeding, plant disease diagnosis, general agricultural planning, etc. A variety of different techniques exist for counting plant-parts-of-interest on crops. Perhaps the simplest technique involves a human manually counting plant-parts-of-interest on a subset of plants, and then extrapolating that count across a superset of plants (e.g., an entire plot or field). However, with many crops, there may be too many plant-parts-of-interest for a human to easily count.

SUMMARY

Computer vision-based techniques may be better suited to count massive numbers of plant-parts-of-interest than manual counting by humans, but those counts may be limited to those plant-parts-of-interest that are visible in a field of view (FOV) of a vision sensor. Occluded plant-parts-of-interest may need to be extrapolated from the visible plant-parts-of-interest, which may be difficult and/or inaccurate without scalable techniques for determining spatial dimensions of a plant. Additionally, while the height of the vision sensor may remain more-or-less constant, different plants will have different spatial dimensions, particularly heights, depending on a variety of factors, such as time since planting, plant breed, agricultural management (e.g., irrigation, application of chemicals such as pesticides, herbicides, fertilizer, etc.), and so forth.

Accordingly, implementations are described herein for normalizing counts of plant-parts-of-interest detected in digital imagery to account for differences in spatial dimensions of plants, particularly plant heights. In various implementations, a depth or range-capable vision sensor such as a stereoscopic camera or RGBd camera may be carried over top of a plurality of plants, e.g., by a farm vehicle such as a tractor or an agricultural robot, to obtain a plurality of digital images that include depth or range information ("depth" and "range" will be used herein interchangeably).

As noted above, different plants will have different heights. For example, one plot of a farm may be growing a first varietal of soybean and another plot of the farm may be growing a second varietal of soybean that is shorter than the first varietal. Assuming the vision sensor is carried over these two varietals at a constant height, the second varietals will be farther from the vision sensor than the first varietals. Even if both varietals are producing plant-parts-of-interest at similar densities, greater numbers of plant-parts-of-interest (e.g., soybean pods) will be visible in digital images depicting the second varietals. To account for these different heights and mitigate against under or over predicting counts of plant-parts-of-interest, distances of the respective varietals from the vision sensor ("ranges-to-canopies" herein) may be estimated and used to normalize or calibrate counts of visible plant-parts-of-interest. For example, in some implementations, a count of visible plant-parts-of-interest in a digital image may be divided by the distance between the vision sensor and top(s) of plant(s) in the digital image.

A range-to-canopy may be determined in various ways. As noted above, the vision sensor may be range capable, and therefore, the vision data it generates may include range data, such as pixel-wise range values. However, a "top" of a plant may not be readily apparent, especially from overhead, because the plant likely has a multitude of components such as leaves, stalks, etc., that have a corresponding distribution of heights. In various implementations, this distribution may be captured in a distribution of pixel-wise range values and used to estimate a range-to-canopy. For example, some quantile of the distribution, such as the top 10% most frequent pixel-wise range values, the closest 5%, the average of the top 10%, etc., may be used as an estimate of the distance between the plant and the vision sensor.

Visible plant-parts-of-interest such as pods, flowers, buds, fruit, berries, etc., may be counted in digital imagery using a variety of techniques. In some implementations, a deep learning convolutional neural network (CNN) may be trained to detect plant-parts-of-interest, e.g., using training digital images in which target plant-parts-of-interest are annotated with bounding boxes or pixel-wise annotations. In various implementations, the model may be a deep object detection model and/or a deep segmentation model.

Normalized counts of visible plant-parts-of-interest may be used for a variety of purposes. In some implementations, additional plant-parts-of-interest that are not visible in the digital imagery, e.g., because they are occluded, may be extrapolated from the normalized counts of visible plant-parts-of-interest so that a total count of plant-parts-of-interest can be predicted. In some such implementations, other signals may be used in addition to visible plant-parts-of-interest to extrapolate these non-visible plant-parts-of-interest. These other signals may include, for instance, color (which can indicate health of a plant), climate data, agricultural management data, prior counts of related plant-parts-of-interest (e.g., previous flower counts may be used as a basis for predicting subsequent pod counts), other spatial dimensions of plants (e.g., height, width, diameter), canopy density, etc.

In some implementations, total counts of plant-parts-of-interest may be estimated at various stages of growth of a crop and used to project a crop yield. In some implementations, a time-series machine learning model such as a recurrent neural network (RNN) may be trained to process sequences of estimated total counts of plant-part-of-interest obtained at different stages of a crop cycle in order to project a crop yield.

In some implementations, a method may be implemented using one or more processors and may include: processing one or more digital images depicting a top of a first plant, wherein the one or more digital images depicting the top of the first plant are acquired by a vision sensor carried over top of the first plant by a ground-based vehicle; based on the processing: estimating a distance of the vision sensor to the first plant, estimating a height of the first plant, and determining a count of visible plant-parts-of-interest that were captured within a field of view of the vision sensor; based on the estimated distance, normalizing the count of visible plant-parts-of-interest with another count of visible plant-parts-of-interest determined from one or more digital images capturing a second plant; and predicting a crop yield based on the normalized count of visible plant-parts-of-interest and the height of the first plant.

In various implementations, the estimated distance of the vision sensor to the first plant may be estimated based on a distribution of pixel-wise range values of one or more of the digital images capturing the first plant. In various implementations, the estimated distance of the vision sensor to the first plant may be calculated as a quantile of the distribution of pixel-wise range values.

In various implementations, the count of visible plant-parts-of-interest may be determined using a convolutional neural network. In various implementations, the plant-parts-of-interest may be bean pods. In various implementations, the estimated distance between the vision sensor and the first plant may be determined based on the estimated height of the first plant and a height of the vision sensor. In various implementations, the first plant and second plants may be different varietals of soybean plants.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Yet other implementations include agricultural vehicles, such as robots, that are equipped with edge processor(s) configured to carry out selected aspects of the present disclosure.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 6 schematically depicts an example architecture of a computer system.

DETAILED DESCRIPTION

Figure 1:
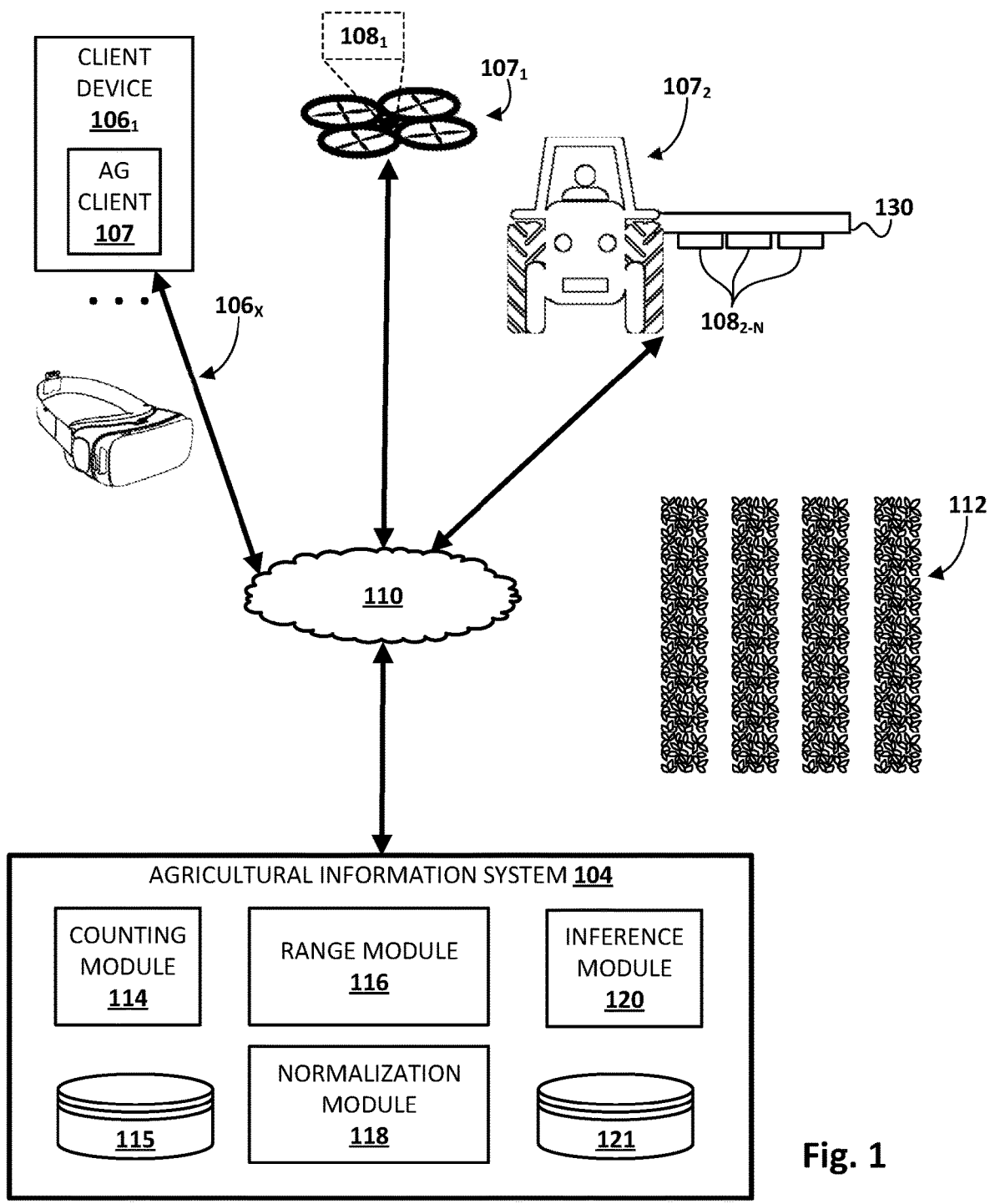
FIG. 1 schematically depicts an example environment in which disclosed techniques may be employed in accordance with various implementations.

FIG. 1 schematically illustrates an environment in which one or more selected aspects of the present disclosure may be implemented, in accordance with various implementations. The example environment includes an agricultural information system 104, one or more client devices $106_{1-X}$, and human-controlled and/or autonomous farm vehicles $107_{1-2}$ that can be operated to carry any number of vision sensors $108_{1-N}$ over top plants of one or more fields 112. The various components depicted in FIG. 1 may be in network communication with each other via one or more networks 110, such as one or more wide area networks ("WANs") such as the Internet, and/or via one or more local area networks ("LANs", e.g., Wi-Fi, Ethernet, various mesh networks) and/or personal area networks ("PANs", e.g., Bluetooth). Field(s) 112 may be used to grow various types of crops that may produce plant-parts-of-interest, where the interest may be economic and/or nutritional, for instance. These crops may include but are not limited to strawberries, tomato plants, soy beans, other types of beans, corn, lettuce, spinach, beans, cherries, nuts, cereal grains, berries, grapes, and so forth.

An individual (which in the current context may also be referred to as a "user") may operate a client device 106 to interact with other components depicted in FIG. 1. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

Figure 2:
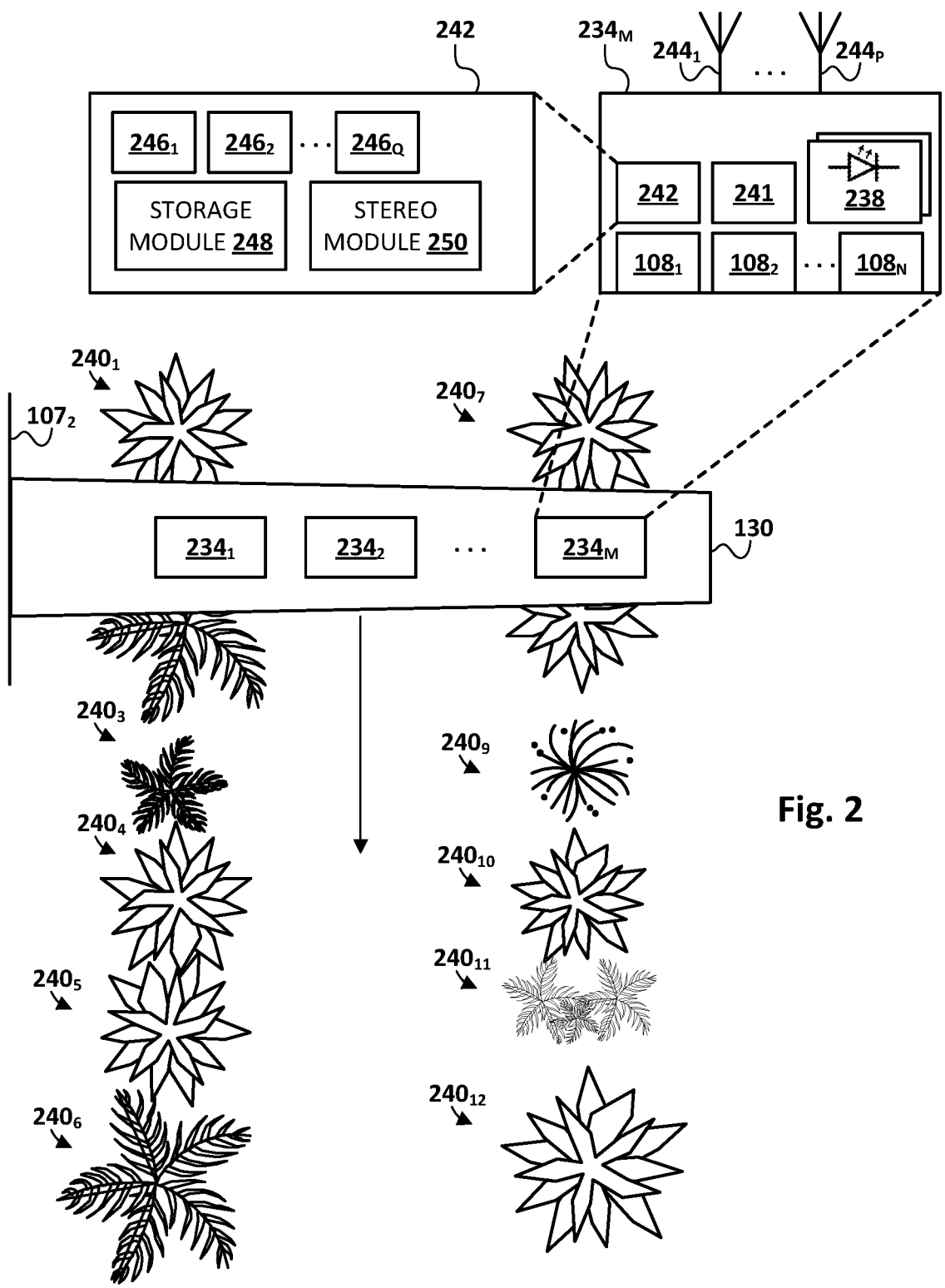
FIG. 2 depicts an example of how computing nodes configured with selected aspects of the present disclosure may be deployed in a field.

Each of client devices 106 and/or agricultural information system 104 may include one or more memories for storage of data and software applications, one or more processors for accessing data and executing applications, and other components that facilitate communication over a network. In various implementations, some vision sensors 108, such as vision sensor $108_1$ associated with aerial drone $107_1$ and/or vision sensors $108_{2-N}$ mounted to a boom 130 of tractor $107_2$, may be integrated into a computing node (which may or may not be modular and/or removable from the vehicle 107 that carries it) that also includes logic such as processor(s), application-specific integrated circuits (ASICs), field-programmable gate arrays (FPGA), etc. FIG. 2 schematically depicts one example of such a vision-sensor-equipped computing node, and will be discussed in more detail shortly.

Vision sensors $108_{1-N}$ may take various forms, particularly forms that are capable of detecting depth or range ("depth" and "range" will be used herein interchangeably). In some implementations, a vision sensor 108 may be a stereoscope camera, and/or may include multiple 2D cameras that are operated in cooperation as a stereoscopic vision sensor. In some implementations, a single camera may be operated as a de facto stereoscopic camera by capturing two images in succession from slightly different angles (e.g., as the vehicle 107 carrying the camera moves) and processing them using stereoscopic techniques. Additionally or alternatively, in some implementations, one or more vision sensors 108 may take the form of a range-capable sensor such as a light detection and ranging (LIDAR) sensor.

Techniques described herein may be performed in whole or in part by various components depicted in FIG. 1. For example, aspect(s) of agricultural information system 104 may be implemented in whole or in part on client device(s) 106, agricultural information system 104, and/or by the computing node(s) mentioned previously.

Each client device 106, may operate a variety of different applications that may be used, for instance, to obtain and/or analyze various agricultural inferences that were generated using techniques described herein. For example, a first client device $106_1$ operates agricultural (AG) client 107 (e.g., which may be standalone or part of another application, such as part of a web browser). Another client device $106_X$ may take the form of a HMD that is configured to render 2D and/or 3D data to a wearer as part of a VR immersive computing experience. For example, the wearer of client device $106_X$ may be presented with 3D point clouds representing various plant-parts-of-interest, such as fruits of crops, weeds, crop yield predictions, etc. The wearer may interact with the presented data, e.g., using HMD input techniques such as gaze directions, blinks, etc.

Individual farm vehicles 107 may take various forms. As shown in FIG. 1 and mentioned previously, some farm vehicles may be operated at least partially autonomously, and may include, for instance, unmanned aerial vehicle $107_1$ that carries a vision sensor $108_1$ that acquires vision sensor data such as digital images from overhead field(s) 112. Other autonomous farm vehicles (e.g., robots) not depicted in FIG. 1 may include a robot that is propelled along a wire, track, rail or other similar component that passes over and/or between crops, a wheeled robot, or any other form of robot capable of being propelled or propelling itself past/through/over crops of interest. In some implementations, different autonomous farm vehicles may have different roles, e.g., depending on their capabilities. For example, in some implementations, one or more robots may be designed to acquire data, other robots may be designed to manipulate plants or perform physical agricultural tasks, and/or other robots may do both. Other farm vehicles, such as a tractor $107_2$, may be autonomous, semi-autonomous, and/or human-driven. As noted above, any of farm vehicle 107 may be equipped with various types of sensors, such as vision sensors $108_{1-N}$. Farm vehicle 107 may be equipped with other sensors as well, such as inertial measurement unit (IMU) sensors, Global Positioning System (GPS) sensors, X-ray sensors, moisture sensors, barometers (for local weather information), photodiodes (e.g., for sunlight), thermometers, etc.

In various implementations, agricultural information system 104 may include a counting module 114, a range module 116, a normalization module 118, and an inference module 120. Agricultural information system 104 may also include one or more databases 115, 121 for storing various data used by and/or generated by modules 114-120, such as data gathered by sensors carried by farm vehicles 107, agricultural inferences, machine learning models that are applied and/or trained using techniques described herein to generate agricultural inferences, and so forth. In some implementations one or more of modules 114-120 may be omitted, combined, and/or implemented in a component that is separate from agricultural information system 104. In various implementations, agricultural information system 104 may be implemented across one or more computing systems that may be referred to as the "cloud."

Counting module 114 may be configured to process digital images acquired by vision sensors $108_{1-N}$ to determine counts of visible plant-parts-of-interest that were within fields of view of vision sensors $108_{1-N}$ when the digital images were acquired. Counting module 114 may employ various techniques to count visible plant-parts-of-interest. In some implementations, counting module 114 may determine counts of plant-parts-of-interest using one or more machine learning models stored in database 115. A machine learning model that is used in such a context may take various forms, including but not limited to a convolutional neural network (CNN).

In some implementations, a machine learning model employed by counting module 114 may be trained to perform object recognition, in which case its output may be indicative of bounding shapes such as bounding boxes. Additionally or alternatively, in some implementations, such a machine learning model may be trained to perform image segmentation, in which case its output may be pixel-wise annotations (or pixel-region-annotations). Other, segmentation and/or object recognition techniques that may or may not be implemented using artificial intelligence, such as thresholding, clustering, compression-based methods, histogram-based methods, region-growing methods, partial differential equation-based methods, graph partitioning methods, watershed methods, and so forth, are also contemplated.

As noted previously, the count of plant-parts-of-interest that are visible in a given digital image may depend on, in addition to the actual density of the plant-parts-of-interest, a distance between the vision sensor 108 and the plant. If the vision sensor is relatively far away from the plant, e.g., because the plant is relatively short, then a relatively large number of plant-parts-of-interest may be captured in the vision sensor's FOV. By contrast, if the vision sensor is relatively close to the plant, e.g., because the plant is relatively tall, then a relatively small number of plant-parts-of-interest may be captured in the vision sensor's FOV.

Accordingly, range module 116 and normalization module 118 (which may be combined in a single module in some cases) may be configured to normalize counts generated by counting module 114 to account and/or mitigate for disparities in plant spatial dimensions, including but not limited to plant height. For example, range module 116 may be configured to process range data to estimate a distance (referred to herein as a "range-to-canopy") between a vision sensor 108 and top(s) of plant(s). In some implementations, these range data may be integral with vision sensor data captured by a vision sensor 108, e.g., in the form of pixel-wise range values. Range module 116 may additionally be configured to process range data to identify ranges other than ranges-to-canopies. For example, in some implementations, range module 116 may process range data indicative of a distance between the ground and the vision sensor (referred to herein as "range-to-ground"). In some such implementations, a height of a plant may be determined based on a difference between range-to-ground and a range-to-canopy.

Based on the various range(s) provided by range module 116 (e.g., range-to-ground, range-to-canopy), normalization module 118 may normalize counts of visible plant-parts-of-interest generated by counting module 114 with other counts of visible plant-parts-of-interest generated by counting module 114 based on other plants (e.g., neighboring plants, different varietals, different plot or field of plants, different greenhouse, etc.). For example, in some implementations, a count generated by counting module 114 for each instance of captured vision data (e.g., each digital image) may be divided by the range-to-canopy calculated for the same instance of captured vision data. In other implementations, the raw count may be normalized in other ways. In some implementations, the raw count may be divided by a power (other than one) of the range-to-canopy. For instance, if the range-to-canopy is x meters, then the raw count could be divided by the second power of x ($x^2$), or even a non-integer power (e.g., $x^{1.5}$, $x^{2.5}$, etc.).

Based on the normalized counts generated by normalization module 118, as well as on any number of other inputs, inference module 120 may be configured to make a variety of different agricultural inferences. For example, inference module 120 may process time series data that includes normalized counts of plant-parts-of-interest based on one or more time-series machine learning models stored in database 121 to generate output indicative of predicted crop yield. Other inputs (e.g., that correspond temporally, or that are preprocessed to corresponding temporally, with normalized counts of plant-parts-of-interest) that may be used by inference module 120 to make agricultural inferences may include, but are not limited to, satellite imagery, climate data (sensed locally or obtained from remote databases), agricultural management data (e.g., applied chemicals, applied irrigation, etc.), soil measurements, prior counts of precursor plant-parts-of-interest (e.g., flowers that eventually morph into other plant-parts-of-interest), and so forth.

FIG. 2 depicts an overhead view of an example field of plants $240_{1-12}$. Boom 130 mounted to tractor $107_2$ (mostly not visible in FIG. 2, see FIG. 1) is being carried over plants $240_{1-12}$ as shown by the arrow to gather sensor data. Boom 130 may include, for instance, sprinklers for irrigation, sprayers for chemical application, etc. Also mounted on boom 130 are a plurality of modular computing nodes $234_{1-M}$ that are configured with selected aspects of the present disclosure. Although shown as boxes on top of boom 130 in FIG. 2, modular computing nodes $234_{1-M}$ may alternatively be mounted at other locations of boom 130, such as on its sides or bottom. And while multiple modular computing nodes $234_{1-M}$ are depicted in FIG. 2, any number of modular computing nodes 234, such as a single modular computing node 234, may be deployed in similar fashions.

As shown by the called-out window at top right, modular computing node $234_M$ includes one or more vision sensors $108_{1-N}$, one or more lights 238, a light controller 241, and logic 242 that is configured to carry out selected aspects of the present disclosure. Other modular computing nodes $234_{1-(M-1)}$ may or may not be similarly configured. Vision sensors $108_{1-N}$ may take various forms of range-capable vision sensors described previously, and may or may not be homogenous.

Light(s) 238 and light controller 241 may be configured to illuminate plants 240, e.g., in synch with operation of vision sensors $108_{1-N}$, in order to make sure that the vision data that is captured is illuminated sufficiently so that it can be used to make accurate agricultural inferences. Light(s) 238 may take various forms, such as the light emitting diode (LED) depicted in FIG. 2, halogen lamps, incandescent lamps, etc. In various implementations, light(s) 238 may be operated, e.g., by light controller 241, to emit various amounts and/or strengths of light (or more generally, electromagnetic radiation).

Modular computing node $234_M$ also includes one or more wireless antenna $244_{1-P}$. In some implementations, each wireless antenna 244 may be configured to transmit and/or receive different types of wireless data. For example, a first antenna $244_1$ may be configured to transmit and/or receive Global Navigation Satellite System (GNSS) wireless data, e.g., for purposes such as localization and/or ROI establishment. Another antenna $244_P$ may be configured to transmit and/or receive IEEE 802.12 family of protocols (Wi-Fi) or Long-Term Evolution (LTE) data. Another antenna 244 may be configured to transmit and/or receive 5G data. Any number of antennas 244 may be provided to accommodate any number of wireless technologies.

In some implementations, a modular computing node 234 may be capable of localizing itself within agricultural field 112 using various technologies. For example, the GNSS antenna $244_1$ may interact with satellite(s) to obtain a position coordinate. Additionally or alternatively, modular computing node 234 may use techniques such as inertial measurement units (IMU) that are generated by, for instance, sensor(s) integral with wheels (not depicted) of tractor $107_2$, accelerometer(s), gyroscope(s), magnetometer(s), etc. In yet other implementations, wireless triangulation may be employed.

Logic 242 may include various types of circuitry (e.g., processor(s), FPGA, ASIC) that is configured to carry out selected aspects of the present disclosure. For example, and as shown in the called-out window at top left in FIG. 2, logic 242 may include any number of tensor processing units (TPU) $246_{1-Q}$, a storage module 248, and a stereo module 250 (one or more graphical process units (GPU) and/or central processing units (CPU) may also be present, even if not depicted). Other configurations are possible. For example, instead of some number of TPUs, in some examples, a modular computing node 234 may include some number of GPUs, each with some number of cores. With the example operational parameters of modular computing node 234 described herein, in some examples, modular computing node 234 may be capable of being moved (or moving itself) at various speeds to perform its tasks (e.g., make agricultural inferences).

Storage module 248 may be configured to acquire and store, e.g., in various types of memories onboard modular computing node 234, sensor data acquired from one or more sensors (e.g., vision sensors $108_{1-N}$). Stereo module 250 may be provided in some implementations in order to reconcile images captured by 2D vision sensors that are slightly offset from each other, and/or to generate 3D images and/or images with depth/range. In various implementations, logic (e.g., 242) of modular computing node(s) $234_{1-M}$ may perform, separately or in cooperation with each other, selected aspects of the present disclosure, including aspects of agricultural information system 104, such as counting module 114, range module 116, normalization module 118, and/or inference module 120.

Figure 3A:
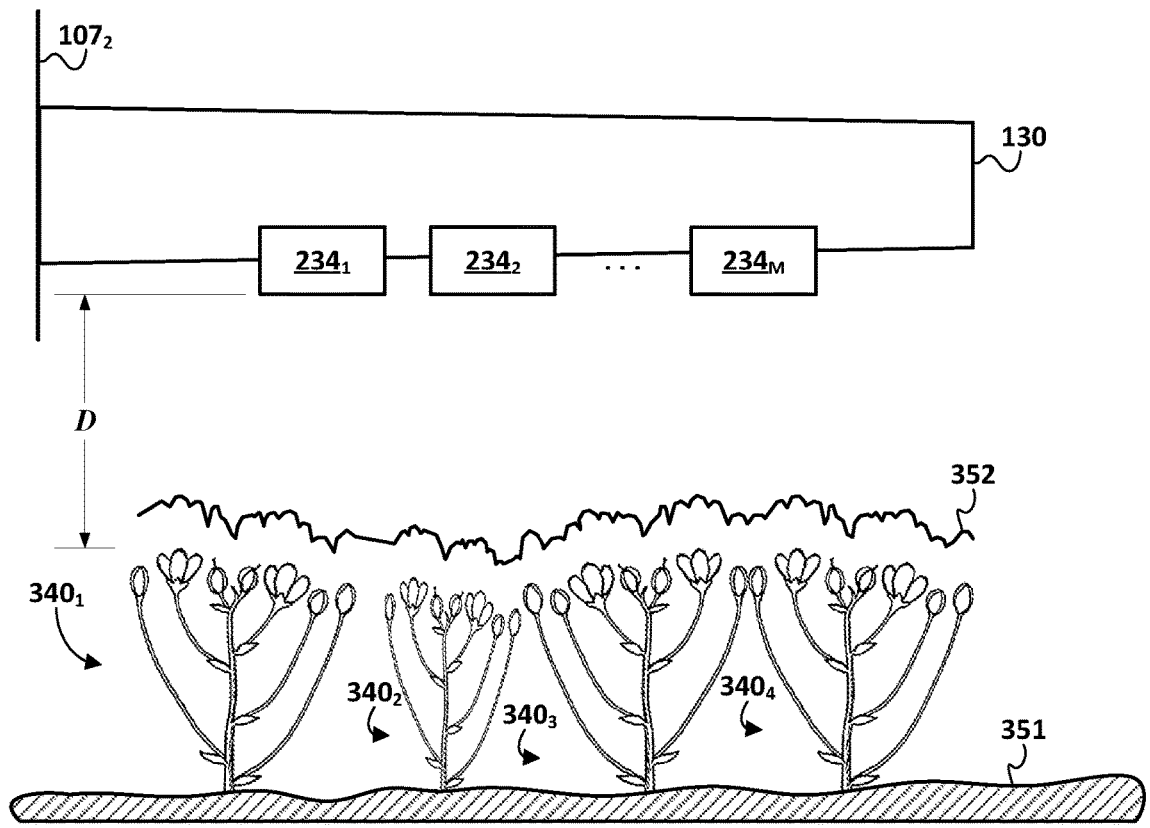
FIG. 3A and FIG. 3B schematically depict an example of how a distribution of ranges-to-canopies may be determined and used to estimate one range-to-canopy for purposes of normalization.
Figure 3B:
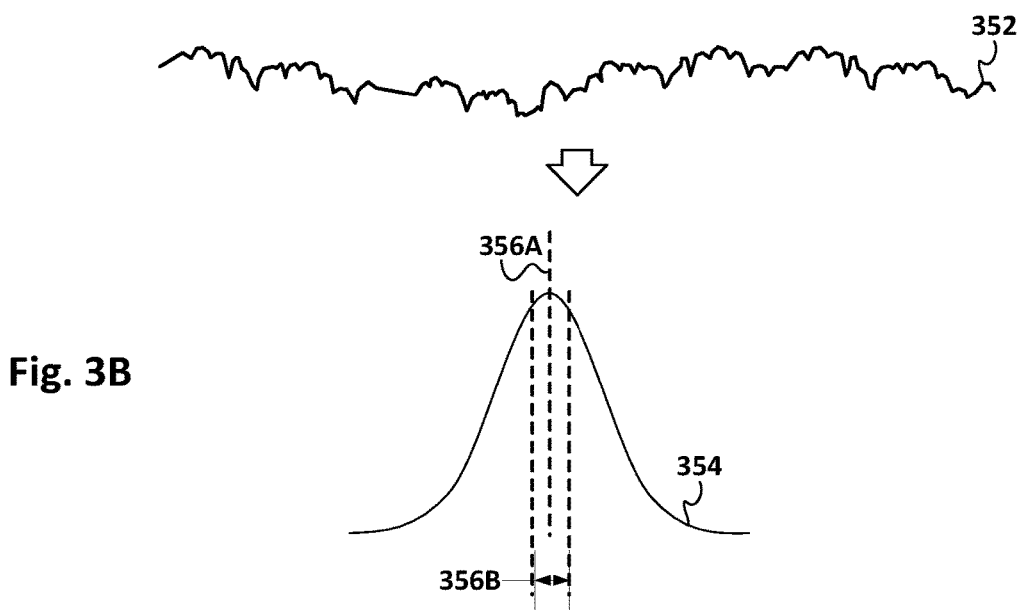

FIGS. 3A and 3B demonstrate an example of how the boom-mounted arrangement of modular computing nodes $234_{1-N}$ of FIG. 2 and their integral vision sensors (not depicted in FIG. 3, see FIGS. 1 and 2) may be operated. As shown, modular computing nodes $234_{1-M}$ are separated from the tops (or canopies) of plants $340_{1-4}$ generally by a distance (range-to-canopy) that is indicated as D in FIG. 3A. It is also evident that each plant 340 has multiple upwardly extending components, and that plants $340_{1-4}$ do not have uniform heights, individually and/or relative to each other.

Vision sensors (again, not depicted in FIG. 3A, see FIGS. 1 and 2) of modular computing nodes $234_{1-M}$ may generate range data as described previously, e.g., from pixel-wise range values contained in digital image(s). This range data may be analyzed by range module 116 to determine a distribution 352 of ranges-to-canopies between modular computing nodes $234_{1-M}$ and plants $340_{1-4}$. The distribution is depicted in FIG. 3A as slightly elevated above the tops of plants $340_{1-4}$ for illustrative purposes.

As shown in FIG. 3B, normalization module 118 may process distribution 352 of heights in order to, for instance, generate a histogram 354 of heights. Normalization module 118 may then estimate a height across one or more of plants $340_{1-4}$ by, for instance, selecting a quantile of the distribution's histogram 354. For example, one option would be quantile 356A, which may represent an average or median of all ranges. Another option would be the quantile range 356B, which may represent, for instance, the top 10% most frequently-occurring pixel-wise range values. For example, an average of the top 10% most frequently-occurring pixel-wise range values could be used as the estimated range-to-canopy, or in FIG. 3A, D. Similar techniques may be employed in order to determine a distance (or range-toground) between vision sensors and ground 351 in FIG. 3A (although the distribution of ground ranges likely would be more uniform than the tops of plants $340_{1-4}$). In some implementations, a difference between range-to-canopy and range-to-ground may be used as estimated height(s) of plant(s) $340_{1-4}$.

While not of entirely uniform height, plants $340_{1-4}$ in FIG. 3A are relatively close to each other in height, which may be expected if they are the same varietal grown under similar conditions (as likely would be the case when grown next to each other as shown). Thus, while distances-to-canopies can be estimated on an individual plant basis, a single range-to-canopy can alternatively be estimated across multiple plants having more or less the same general heights.

For example, one farm may grow multiple varietals of a particular plant for a variety of reasons, such as satisfying demand for multiple varietals, being able to select between varietals depending on results, risk diversification, etc. If these different varietals have different heights, then in some implementations, a range-to-canopy may be estimated for multiple plants of one varietal, and another range-to-canopy may be estimated for multiple plants of another varietal. Normalization module 118 may then normalize counts across these multiple ranges-to-canopies to account for the disparity in heights between varietals. Assuming the multiple different varietals generate plant-parts-of-interest at similar densities, this normalization will prevent shorter plants from being interpreted as more densely producing.

Figure 4:
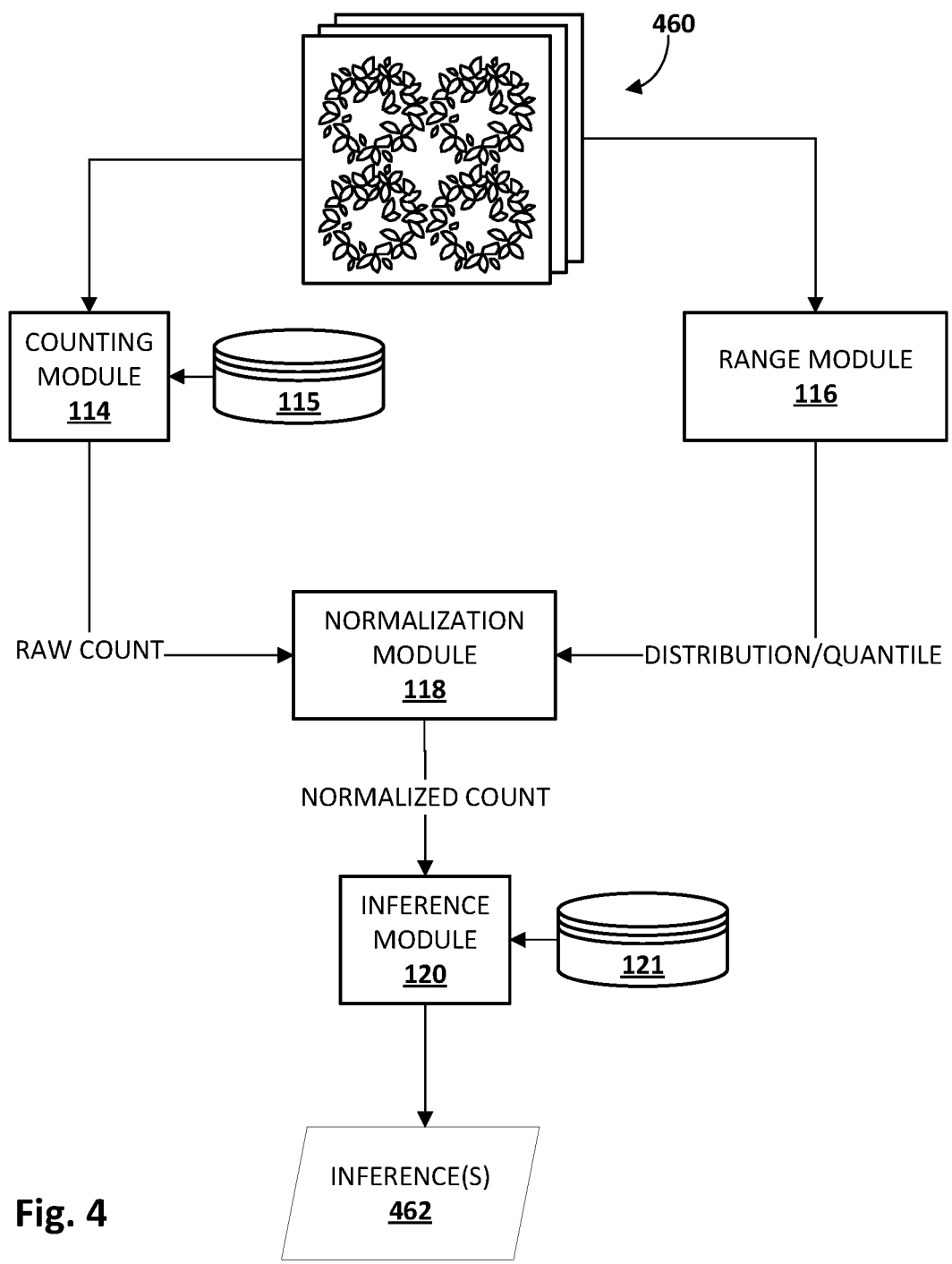
FIG. 4 depicts an example of how various components described herein may exchange and process data to normalize counts of plant-parts-of-interest and make downstream inferences therefrom.

FIG. 4 depicts an example of how various components described herein may exchange and process data to normalize counts of plant-parts-of-interest and make downstream inferences therefrom. A sequence of digital images 460 that depict plants from overhead is generated, e.g., by one or more vision sensors 108 carried by a vehicle such as a land-based vehicle (e.g., tractor $107_2$) or an aerial drone (e.g., $107_1$). These images 460 are provided to counting module 114 and range module 116 for processing. As described previously, counting module 114 may employ various techniques, such as machine-learning segmentation and/or object recognition (e.g., using a model from database 115), to generate a raw count of visible plant-parts-of-interest in each digital image. Meanwhile (e.g., in parallel), range module 116 may process the images 460 to generate range-to-canopy and/or range-to-ground distributions and/or estimated values for each image, for groups of images (e.g., groups of images depicting the same varietal), etc.

Normalization module 118 may use the range distributions/estimates received from range module 116 to normalize the raw counts of plant-parts-of-interest received from counting module 114. Normalization module 118 may then provide the normalized count(s) to inference module 120. Inference module 120 may apply various types of machine learning models from database 121 to various data, such as digital images 460, climate data, agricultural management data, soil data, as well as the normalized counts received from normalization module 118, to generate various inferences 462. These inference 462 may include, but are not limited to, crop yield predictions, plant disease diagnosis, agricultural recommendations (e.g., more irrigation, less pesticide, etc.), crop rotation recommendations, soil organic compound (SOC) estimates, etc.

Figure 5:
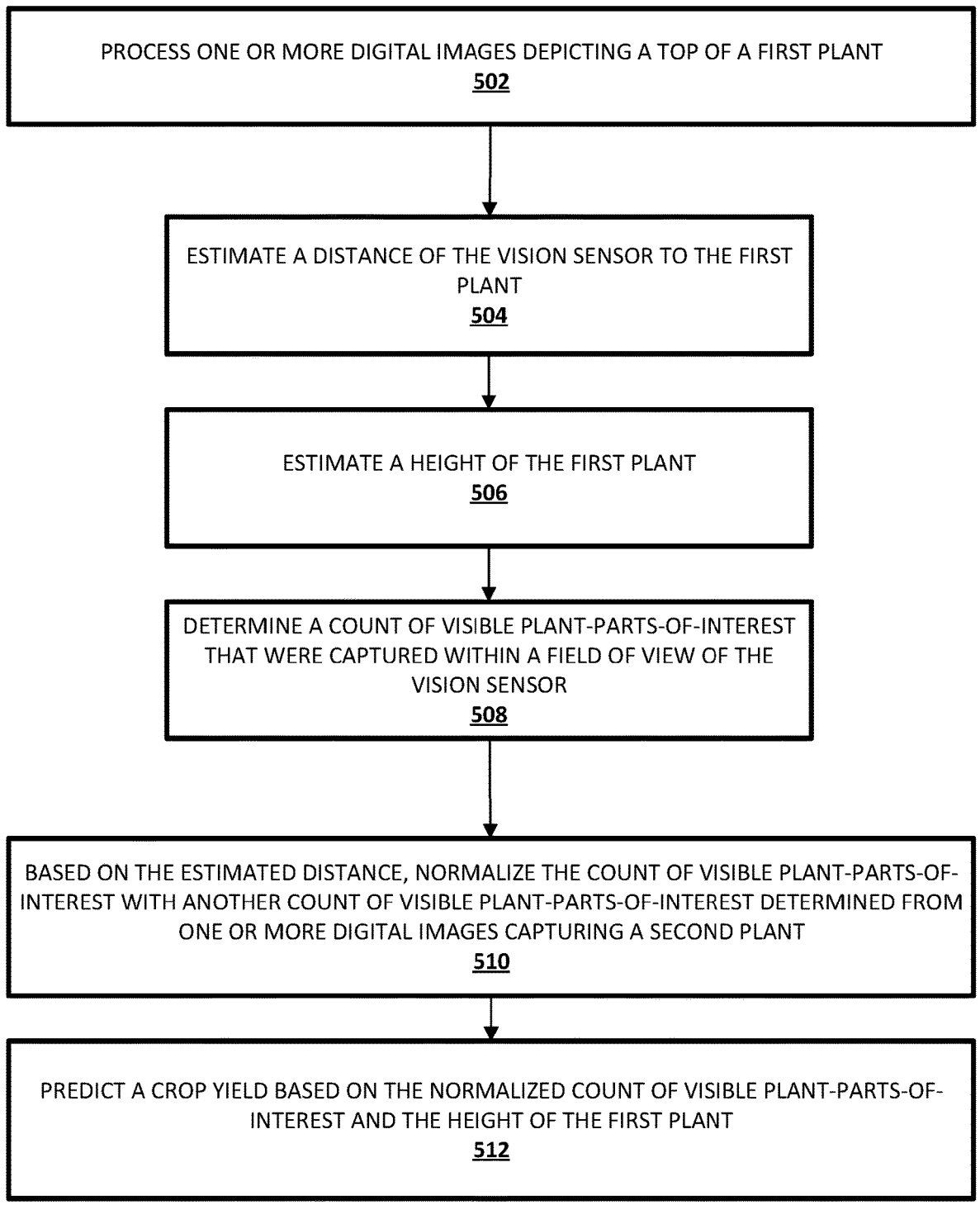
FIG. 5 is a flowchart of an example method in accordance with various implementations described herein.

FIG. 5 illustrates a flowchart of an example method 500 for practicing selected aspects of the present disclosure. For convenience, operations of method 500 will be described as being performed by a system configured with selected aspects of the present disclosure. Other implementations may include additional operations than those illustrated in FIG. 5, may perform operation(s) of FIG. 5 in a different order and/or in parallel, and/or may omit one or more of the operations of FIG. 5.

At block 502, the system, e.g., by way of counting module 114 and/or range module 116, may process one or more digital images depicting the top of a first plant. In various implementations, the one or more digital images may have been acquired by a vision sensor (e.g., 108) carried over top of the first plant by a ground-based vehicle (e.g., tractor $107_2$).

As indicated by the narrowing of the boxes in FIG. 5, operations 504-508 may be performed as part of/based on the processing of block 502. At block 504, the system, e.g., by way of range module 116, may estimate a distance of the vision sensor to the first plant (range-to-canopy described previously). At block 506, the system, e.g., by way of range module 116, may estimate a height of the first plant (range-to-ground described previously). At block 506, the system, e.g., by way of counting module 114, may determine a count (e.g., the raw count of FIG. 4) of visible plant-parts-of-interest that were captured within a field of view of the vision sensor.

Based on the distance estimated at block 504, at block 510, the system, e.g., by way of normalization module 118, may normalize the count of visible plant-parts-of-interest with another count of visible plant-parts-of-interest determined from one or more digital images capturing a second plant. At block 512, the system, e.g., by way of inference module 120, may predict a crop yield based on the normalized count of visible plant-parts-of-interest generated at block 510 and the height of the first plant estimated at block 506.

Other applications of techniques described herein are also contemplated. For example, range-to-canopy can be used to calculate the sizes of plant-parts-of-interest, such as the size of soybean pods. This soybean pod size could further be used to predict crop yield. As another example, range-to-canopy and/or range-to-ground could be used to determine other spatial dimensions of a plant, such as its width. The plant's width and height may be used, e.g., by counting module 114, to extrapolate a total count of plant-parts-of-interest, for instance.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method 500 described herein, as well as to implement various components depicted in FIGS. 1, 2, and 4.

These software modules are generally executed by processor 614 alone or in combination with other processors. Memory subsystem 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    obtaining a plurality of digital images acquired by a range-capable vision sensor carried by a ground-based vehicle at a constant height over at least first and second plants, wherein differing heights of the first and second plants cause tops of the first and second plants to be first and second distances, respectively, from the range-capable vision sensor as it passes overhead at the constant height;
    processing one or more of the digital images depicting the top of the first plant;
    based on the processing:
        estimating the first distance of the range-capable vision sensor to the first plant,
        estimating a first height of the first plant, and
        determining a count of visible plant-parts-of-interest of the first plant that were captured within a field of view of the range-capable vision sensor;
    based on the estimated first distance, normalizing the count of visible plant-parts-of-interest of the first plant with another count of visible plant-parts-of-interest determined from one or more of the digital images depicting the top of the second plant; and
    predicting a crop yield using the normalized count of visible plant-parts-of-interest and the first height of the first plant.

2. The method of claim 1, wherein the estimated first distance of the range-capable vision sensor to the first plant is estimated based on a distribution of pixel-wise ranges-to-canopies between the range-capable vision sensor and the first plant, wherein the pixel-wise ranges-to-canopies are detected by the range-capable vision sensor and included in one or more of the digital images capturing the first plant.

3. The method of claim 2, wherein the estimated first distance of the range-capable vision sensor to the first plant is calculated as a quantile of the distribution of pixel-wise ranges-to-canopies.

4. The method of claim 1, wherein the count of visible plant-parts-of-interest is determined using a convolutional neural network.

5. The method of claim 1, wherein the visible plant-parts-of-interest comprise bean pods.

6. The method of claim 1, wherein the estimated first distance between the range-capable vision sensor and the first plant is determined based on the estimated height of the first plant and the height of the range-capable vision sensor.

7. The method of claim 1, wherein the first plant and second plants are different varietals of soybean plants.

8. A system comprising one or more processors and memory storing instructions that, in response to execution of the instructions by the one or more processors, cause the one or more processors to:
    obtain a plurality of digital images acquired by a range-capable vision sensor carried by a ground-based vehicle at a constant height over at least first and second plants, wherein differing heights of the first and second plants cause tops of the first and second plants to be first and second distances, respectively, from the range-capable vision sensor as it passes overhead at the constant height;

process one or more of the digital images depicting the top of the first plant;

based on the processing:
  estimate a distance of the range-capable vision sensor to the first plant,
  estimate a first height of the first plant, and
  determine a count of visible plant-parts-of-interest of the first plant that were captured within a field of view of the range-capable vision sensor;

based on the estimated first distance, normalize the count of visible plant-parts-of-interest of the first plant with another count of visible plant-parts-of-interest determined from one or more of the digital images depicting the top of the second plant; and predict a crop yield using the normalized count of visible plant-parts-of-interest and the first height of the first plant.

9. The system of claim 8, wherein the estimated first distance of the range-capable vision sensor to the first plant is estimated based on a distribution of pixel-wise ranges-to-canopies between the range-capable vision sensor and the first plant, wherein the pixel-wise ranges-to-canopies are detected by the range-capable vision sensor and included in one or more of the digital images capturing the first plant.

10. The system of claim 9, wherein the estimated first distance of the range-capable vision sensor to the first plant is calculated as a quantile of the distribution of pixel-wise ranges-to-canopies.

11. The system of claim 8, wherein the count of visible plant-parts-of-interest is determined using a convolutional neural network.

12. The system of claim 8, wherein the visible plant-parts-of-interest comprise bean pods.

13. The system of claim 8, wherein the estimated first distance between the range-capable vision sensor and the first plant is determined based on the estimated height of the first plant and the height of the range-capable vision sensor.

14. The system of claim 8, wherein the first plant and second plants are different varietals of soybean plants.

15. A non-transitory computer-readable medium comprising instructions that, in response to execution of the instructions by a processor, cause the processor to perform the following operations:
  obtaining a plurality of digital images acquired by a range-capable vision sensor carried by a ground-based vehicle at a constant height over at least first and second plants, wherein differing heights of the first and second plants cause tops of the first and second plants to be first and second distances, respectively, from the range-capable vision sensor as it passes overhead at the constant height;

processing one or more of the digital images depicting the top of the first plant;

based on the processing:
  estimating the first distance of the range-capable vision sensor to the first plant,
  estimating a first height of the first plant, and
  determining a count of visible plant-parts-of-interest of the first plant that were captured within a field of view of the range-capable vision sensor;

based on the estimated first distance, normalizing the count of visible plant-parts-of-interest of the first plant with another count of visible plant-parts-of-interest determined from one or more of the digital images depicting the top of the second plant; and predicting a crop yield using the normalized count of visible plant-parts-of-interest and the first height of the first plant.

16. The at least one non-transitory computer-readable medium of claim 15, wherein the estimated first distance of the range-capable vision sensor to the first plant is estimated based on a distribution of pixel-wise ranges-to-canopies between the range-capable vision sensor and the first plant, wherein the pixel-wise ranges-to-canopies are detected by the range-capable vision sensor and included in one or more of the digital images capturing the first plant.

17. The at least one non-transitory computer-readable medium of claim 16, wherein the estimated first distance of the range-capable vision sensor to the first plant is calculated as a quantile of the distribution of pixel-wise ranges-to-canopies.

18. The at least one non-transitory computer-readable medium of claim 15, wherein the count of visible plant-parts-of-interest is determined using a convolutional neural network.

19. The at least one non-transitory computer-readable medium of claim 15, wherein the plant-parts-of-interest comprise bean pods.

20. The at least one non-transitory computer-readable medium of claim 15, wherein the estimated first distance between the range-capable vision sensor and the first plant is determined based on the estimated height of the first plant and the height of the range-capable vision sensor.

* * * * *